United States Patent
Jingu (10) Patent No.: US 8,892,282 B2
(45) Date of Patent: Nov. 18, 2014

(54) ELECTRICALLY DRIVEN VEHICLE

(75) Inventor: Nobuhisa Jingu, Izunokuni (JP)

(73) Assignee: Toyota Jidosha Kabushiki Kaisha, Toyota-shi (KP)

( * ) Notice: Subject to any disclaimer, the term of this patent is extended or adjusted under 35 U.S.C. 154(b) by 76 days.

(21) Appl. No.: 13/520,951

(22) PCT Filed: Jan. 15, 2010

(86) PCT No.: PCT/JP2010/050393
§ 371 (c)(1),
(2), (4) Date: Jul. 6, 2012

(87) PCT Pub. No.: WO2011/086681
PCT Pub. Date: Jul. 21, 2011

(65) Prior Publication Data
US 2012/0330486 A1    Dec. 27, 2012

(51) Int. Cl.
*G06F 7/00* (2006.01)
*B60L 11/18* (2006.01)
*B60L 11/12* (2006.01)

(52) U.S. Cl.
CPC ............ *B60L 11/126* (2013.01); *Y02T 10/7005* (2013.01); *Y02T 10/7077* (2013.01); *B60L 11/1861* (2013.01); *Y02T 10/7044* (2013.01); *Y02T 10/6217* (2013.01); *Y02T 10/705* (2013.01); *B60L 11/123* (2013.01)
USPC ........................ 701/22; 180/65.31; 429/430

(58) Field of Classification Search
USPC ........................ 701/22; 180/65.31; 429/430
See application file for complete search history.

(56) References Cited

U.S. PATENT DOCUMENTS

2008/0314660 A1   12/2008   Davies et al.
2009/0061269 A1 *   3/2009   Muramatsu .................... 429/23

FOREIGN PATENT DOCUMENTS

| JP | 8 182112 | 7/1996 |
|---|---|---|
| JP | 10 117404 | 5/1998 |
| JP | 11 69512 | 3/1999 |
| JP | 11 191902 | 7/1999 |
| JP | 2001 211504 | 8/2001 |
| JP | 2003 286000 | 10/2003 |
| JP | 2003286000 A  * | 10/2003 |
| JP | 2005 237064 | 9/2005 |
| JP | 2005237064 A  * | 9/2005 |
| JP | 2007 43881 | 2/2007 |
| JP | 2007 135380 | 5/2007 |
| JP | 2008 529230 | 7/2008 |
| JP | 2008 296669 | 12/2008 |
| JP | 2008296669 A  * | 12/2008 |
| JP | 2009 76453 | 4/2009 |

OTHER PUBLICATIONS

English translation of jp2003-286000 and jp2008-296669.*
English translation of JP 2005237064 A.*
International Search Report Issued Mar. 23, 2010 in PCT/JP10/50393 Filed Jan. 15, 2010.
International Preliminary Report on Patentability Issued Mar. 29, 2012 in PCT/JP10/50393 Filed Jan. 15, 2010.

* cited by examiner

*Primary Examiner* — Fadey Jabr
*Assistant Examiner* — Yazan A Soofi
(74) *Attorney, Agent, or Firm* — Oblon, Spivak, McClelland, Maier & Neustadt, L.L.P.

(57) ABSTRACT

An electrically driven vehicle includes: a vehicle body; a first battery mounted in the vehicle body and usable for running; a generator unit that is detachably mounted in the vehicle body and charges the first battery; diagnosis means for diagnosing whether the generator unit is capable of generating power; and management means for performing a management of an amount of charge of the first battery according to a diagnostic result of the diagnosis means.

6 Claims, 4 Drawing Sheets

FIG. 6

ELECTRICALLY DRIVEN VEHICLE

TECHNICAL FIELD

The present invention relates to electrically driven vehicles, and more particularly, to an electrically driven vehicle in which a generator unit that charges a battery usable for running is detachably mounted.

BACKGROUND ART

Conventionally, there is known an electrically driven vehicle equipped with a battery usable for running. Such an electrically driven vehicle has a limited cruising range that depends on the amount of charge of the battery.

In this regard, Patent Document 1 discloses an electric vehicle in which a first battery is mounted and a generator unit or a second battery is detachably mounted. The electric vehicle disclosed in Patent Document 1 is configured to mount the second battery when the electric vehicle is driven around a charge station or home, and to mount the generator unit when the electric vehicle is driven a long ways.

Patent Document 2 discloses an art that is considered as being relative to the present invention regarding mounting of a generator capable of charging a battery mounted in a vehicle. Patent Documents 3 through 5 disclose arts that are considered as being relative to the present invention in terms of mounting of more than one battery.

PRIOR ART DOCUMENTS

Patent Documents

Patent Document 1: Japanese Patent Application Publication No. 10-117404
Patent Document 2: Japanese Patent Application Publication No. 2001-211504
Patent Document 3: Japanese Patent Application Publication No. 2005-237064
Patent Document 4: Japanese Patent Application Publication No. 11-191902
Patent Document 5: Japanese Patent Application Publication No. 11-69512

SUMMARY OF THE INVENTION

Problem to be Solved by the Invention

In the electric vehicle equipped with the battery for running, generally, the amount of charge of the battery may be managed to output an alarm for urging the user to charge the battery when the amount of charge of the battery reduces.

In this regard, in a case where a generator unit is detachably mounted in the electrically driven vehicle, it is conceivable to charge the battery by using the generator unit rather than the outputting of the alarm that urges the user to charge the battery when the electrically driven vehicle has a reduced amount of charge of the battery with the generator unit being really mounted therein. That is, it is conceivable that similar setting values are used for management of the amount of charge of the battery in a case where the generator unit has been mounted and in another case where the generator unit has not been mounted.

However, the case where the generator unit has been mounted does not always need to secure a certain amount of charge of the battery that is estimated to be feasible for retreat running or running up to a charge station.

Further, in the case where the battery is charged by using the generator unit, the operation start timing of the generator unit may affect the appropriate use of the battery. That is, if the operation of the generator unit is started relatively early with respect to the remaining amount of charge of the battery, the battery will not be efficiently utilized accordingly. In contrast, if the operation of the generator unit is started relatively late, the battery will be worked hard accordingly.

In this regard, the electric vehicle disclosed in Patent Document 1 configured to detachably mount the generator unit does not have a specific consideration about the management of the amount of charge of the first battery between the case where the generator unit has been mounted and the case where the generator unit has not been mounted. Therefore, the electric vehicle disclosed in Patent Document 1 has a problem because the first battery may not be always utilized appropriately.

The present invention was made in view of the above problem and aims to provide an electrically driven vehicle capable of ensuring proper use of a battery when a generator unit is detachably mounted.

Means for Solving the Problem

The present invention for solving the above problem is an electrically driven vehicle comprising: a vehicle body; a first battery mounted in the vehicle body and usable for running; a generator unit that is detachably mounted in the vehicle body and charges the first battery; diagnosis means for diagnosing whether the generator unit is capable of generating power; and management means for managing an amount of charge of the first battery according to a diagnostic result of the diagnosis means.

The present invention is preferably configured so that a lower usage limit is provided for the amount of charge of the first battery; and when the diagnosis means determines that the generator unit is capable of generating power, the management means changes, as a management of the amount of charge of the first battery, the lower usage limit to a level lower than that used when the generator unit is not capable of generating power.

The present invention is preferably configured so that a second battery usable for running is detachably mounted in the vehicle body; and the diagnosis means diagnoses whether the second battery is usable, and when the diagnosis means determines that the generator unit is capable of generating power, the management means changes, as the management of the amount of charge of the first battery, the lower usage limit to a level lower than that used when the second battery is not usable.

The present invention is preferably configured so that a lower usage limit is provided for the amount of charge of the first battery; and when the diagnosis means determines that the generator unit is capable of generating power, the management means changes, as a management of the amount of charge of the first battery, the lower usage limit to a level higher than that used when the generator unit is not capable of generating power.

The present invention is preferably configured so that a second battery usable for running is detachably mounted in the vehicle body; and the diagnosis means diagnoses whether the second battery is usable, and when the diagnosis means determines that the generator unit is capable of generating power, the management means changes, as the management of the amount of charge of the first battery, the lower usage limit to a level higher than that used when the second battery is not usable.

The present invention is preferably configured so that the diagnosis means diagnoses a generating feasible power amount of the generator unit in a process of diagnosing whether the generator unit is capable of generating power; and the management means further amend the management of the amount of charge of the first battery according to the generating feasible power amount.

Effects of the Invention

According to the present invention, it is possible to ensure proper use of the battery when the generator unit is detachably mounted.

MODE FOR CARRYING OUT THE INVENTION

Now, a description is given of modes for carrying out the invention in conjunction with the drawings.

Figure 1:
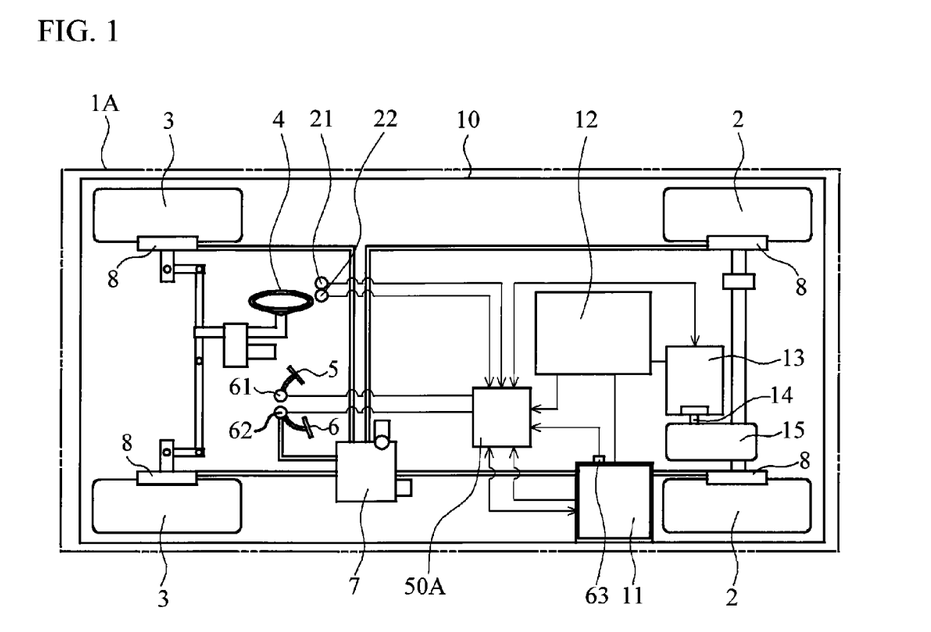
FIG. 1 is a diagram of a schematic structure of an electrically driven vehicle in accordance with a first embodiment.

As illustrated in FIG. 1, an electrically driven vehicle 1A has a vehicle body 10 in which a generator unit 11, a battery 12, and an electric motor 13 are mounted. The electrically driven vehicle 1A is configured so that the generator unit 11 is detachably mounted. The electrically driven vehicle 1A capable of detachably installing the generator unit 11 can be operated in a state in which the generator unit 11 is not mounted and is electrically disconnected.

Figure 2:
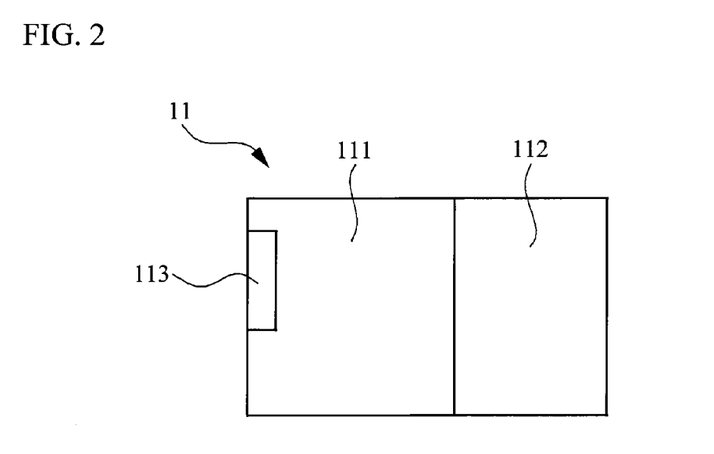
FIG. 2 is a diagram of a generator unit in accordance with the first embodiment.

The generator unit 11 is an engine driven type of generator unit, and is equipped, as illustrated in FIG. 2, with an engine 111, a generator 112, a generator-unit-side ECU 113, and a generator-unit-side fuel tank 114. The engine 111 drives the generator 112, which generates alternating current. Then, the alternating current thus generated is converted to direct current by a not-illustrated rectifying circuit before being charged in the battery 12. The generator-unit-side ECU 113 is provided for primarily controlling the engine 111.

As illustrated in FIG. 1, the battery 12 is a direct current battery, and is electrically and detachably connected to the generator unit 11 via high-voltage system wires that are power-system wires. Energy generated by the generator unit 11 is stored in the battery 12 via the high-voltage system wires. The battery 12 may be configured to have multiple batteries having a rated DC voltage of 12 V connected in series, for example. The electric motor 13 is a source for running, and is a DC motor. The electric motor 13 is supplied with energy from the battery 12, and rotates an output shaft 14. Then, the rotary output is transmitted, via a transmission 15, to a pair of right and left rear wheels 2, which are driving wheels, so that the rear wheels 2 can be driven. As described above, the electrically driven vehicle 1A is a series hybrid type of electrically driven vehicle.

The electrically driven vehicle 1A is equipped, in addition to the pair of right and left rear wheels 2 of the driving wheels, with a pair of right and left front wheels 3 that are steering wheels, a handle 4 for manually steering the front wheels 3, an acceleration pedal 5 for changing the number of revolutions of the electric motor 13, a brake pedal 6 and a brake unit 7 for braking the vehicle, and drum brakes 8 coupled with the brake pedal 6 by wires, joined to the brake unit 7 and provided to the front wheels 3 and the rear wheels 2. The acceleration pedal 5 is provided with an acceleration position sensor 26 that senses the amount of depression of the acceleration pedal 5, and the brake pedal 6 is provided with a brake switch 62 that senses whether the brake pedal 6 is depressed or not.

The electrically driven vehicle 1A is further provided with a key switch 21, and a generation switch 22. The key switch 21 and the generation switch 22 are switches that enable selective switching operation between ON and OFF. The key switch 21 is operation means for making an operation request to the electric motor 13. Specifically, when the key switch 21 is ON, the operation request to the electric motor 13 is made. When the key switch 21 is OFF, the operation request to the electric motor 13 is not made. The generation switch 22 is operation means for making a request to the generator unit 11. Specifically, when the generation switch 22 is ON, the operation request to the generator unit 11 is made. When the generation switch 22 is OFF, the operation request to the generator unit 11 is not made. The key switch 21 and the generation switch 22 are provided on a not-illustrated instrument panel.

As illustrated in FIG. 1, the electrically driven vehicle 1A is equipped with a vehicle-side ECU 50A, which is a first control unit. The vehicle-side ECU 50A is equipped with a microcomputer composed of a CPU, a ROM, a RAM and so on, and an input/output circuit, which are not illustrated. The generator-unit-side ECU 113, which is a second control unit, is configured similarly. The generator unit 11 (more specifically, the generator-unit-side ECU 113) is electrically and detachably connected to the vehicle-side ECU 50A. In this regard, the vehicle-side ECU 50A and the generator unit 11 are connected together via low-voltage system wires, which are control-system wires.

Various objects to be controlled such as the electric motor 13 are electrically connected to the vehicle-side ECU 50A, and further, various sensors and switches such as the key switch 21, the acceleration position sensor 61, the brake switch 62, and a first mount sensor 63 that is a state sensing means capable of detecting whether the generator unit 11 is mounted or not are electrically connected thereto.

A first battery 12 is electrically connected to the vehicle-side ECU 50A in order to detect the amount of charge of the battery. The electrically driven vehicle 1A has a lower usage limit to the amount of charge of the first battery 12.

The ROM is configured to store a program in which various processes executed by the CPU are described and to store map data. The CPU executes the processes on the basis of the program stored in the ROM while using a temporary memory area ensured in the RAM as necessary, so that various control means, determination means, detection means and calculation means can be functionally realized in the ECU 50A on the vehicle side and the ECU 113 on the generator unit side.

The vehicle-side ECU 50A functionally realizes diagnosis means for diagnosing whether the generator unit 11 can generate power.

In the step of diagnosing whether the generator unit 11 can generate power, the diagnosis means is realized to diagnose the generating feasible state of the generator unit 11.

Specifically, the diagnosis means may be realized to diagnose the generating feasible state of the generator unit 11 by determining whether the generator unit 11 has been mounted.

The diagnosis means may be realized to diagnose the generating feasible state of the generator unit 11 by determining whether a not-illustrated interlock device provided for detecting whether the mounted state of the generator unit 11 has a regular state (for example, a fixing confirmation device of the generator unit 11, or a lock confirmation device of a door for a storage space for the generator unit 11), or determining whether the electrically connected state of the generator unit 11 has any abnormality, or by determining whether the mechanically connected state of the generator unit 11 has any abnormality, or determining whether the generator unit 11 has any abnormality such as failure, or a combination of the above determinations.

Specifically, the diagnosis means is realized to diagnose the generating feasible state of the generator unit 11 by using a combination of determinations.

More specifically, the diagnosis means is realized to determine that the generator unit 11 is capable of generating power when the diagnostic results show that the generator unit 11 has been mounted and the interlock device detects the regular state and that the amount of fuel for the generator unit 11 is equal to or larger than a predetermined level and the electric and mechanical connections of the generator unit 11 have no abnormality, and show that the generator unit 11 has no abnormality.

In the step of diagnosing the generation feasible state of the generator unit 11, the diagnosis means may be realized to include, as a basic determination, at least the step of determining whether the generator unit 11 has been mounted. However, the diagnosis is not limited to the above, but may include, as a basic determination, the step of determining whether the electric and mechanical connections of the generator unit 11 have any abnormality, whereby the determination as to whether the generator unit 11 has been mounted may be made indirectly.

The vehicle-side ECU 50A functionally realizes management means for performing a management of the amount of charge of the first battery 12 according to the diagnostic results of the diagnosis means, for example.

Specifically, the management means is realized to change the lower usage limit as a management of the amount of charge of the first battery 12 when the diagnosis means determines that the generator unit 11 is capable of generating power. Specifically, the predetermined lower usage limit (hereinafter, referred to as preset lower usage limit) is defined for a case where the generator unit 11 is not capable of generating power. More specifically, the preset lower usage limit is the amount of charge stored in the battery that is estimated to be feasible for retreat running or running up to a charge station.

In the process of changing the lower usage limit, specifically, the management means may be realized to set the lower usage limit to a level lower than that for the case where the generator unit 11 is not capable of generating power. Also, the management means may be realized to set the lower usage limit to a level higher than that for the case where the generator unit 11 is not capable of generating power.

The vehicle-side ECU 50A functionally realizes alarm control means that outputs an alarm when the amount of charge of the first battery 12 becomes lower than the lower usage limit. Specifically, the alarm control means is realized to output the alarm that notifies the user that the amount of charge of the first battery 12 becomes lower than the lower usage limit when the generator unit 11 is not capable of generating power and the amount of charge of the first battery 12 becomes lower than the lower usage limit. Specifically, the lower usage limit in this case is the preset lower usage limit.

The vehicle-side ECU 50A functionally realizes output control means for outputting an operation request to the generator unit 11 when the generator unit 11 is capable of generating power and the amount of charge of the battery becomes lower than the lower use limit. In this case, the lower usage limit is a changed lower usage limit.

Figure 3:
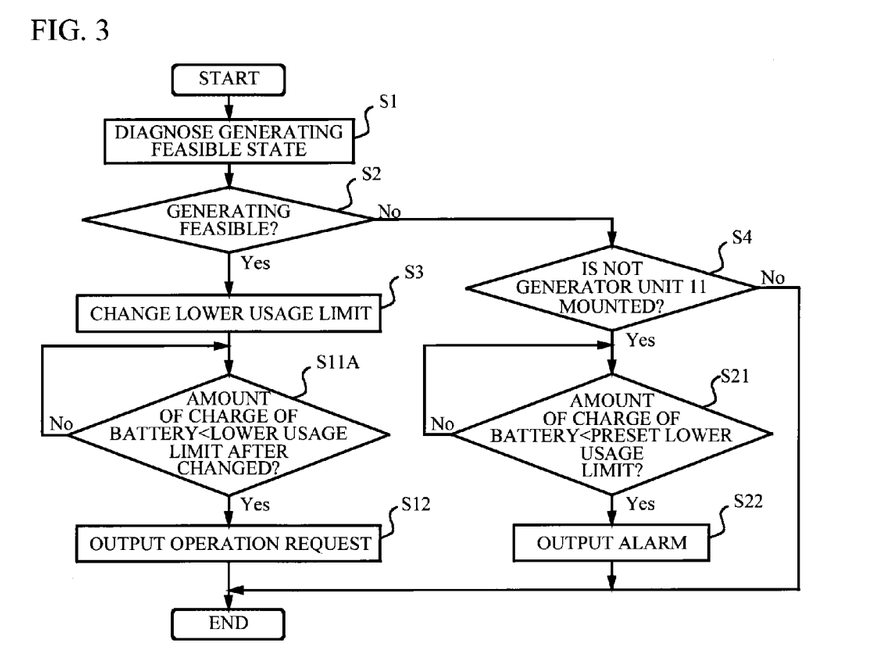
FIG. 3 is a flowchart of an operation of a vehicle-side ECU (Electric Control Unit) in accordance with Embodiment 1.

A description is now given of an operation of the vehicle-side ECU 50A in conjunction with a flowchart of FIG. 3. The vehicle-side ECU 50A diagnoses the generating feasible state of the generator unit 11 (step S1), and determines whether the generator unit 11 is capable of generating power (step S2). When a negative determination is made, the vehicle-side ECU 50A determines whether the generator unit 11 has not been mounted (step S4). When a positive determination is made, the flow process is ended. In this case, an alarm that indicates an abnormality of the generator unit 11 may be output. In contrast, a negative determination is made in step S4, the vehicle-side ECU 50A determines whether the amount of charge of the battery becomes the lower usage limit (step S21). When a negative determination is made, step S21 is repeatedly performed until a positive determination is made. When a positive determination is made in step S21, the vehicle-side ECU 50A outputs an alarm showing that the amount of charge of the battery becomes lower than the lower usage limit (step S22).

In contrast, when a positive determination is made in step S2, the vehicle-side ECU 50A changes the lower usage limit (step S3). Subsequently, the vehicle-side ECU 50A determines whether the amount of charge of the battery becomes lower than the changed lower usage limit (step S11A). When a negative decision is made, step S11A is repeatedly performed until a positive determination is made. In contrast, when a positive determination is made in step S11A, the vehicle-side ECU 50A outputs the operation request to the generator unit 11 (step S12). Thus, the generator unit 11 starts generating power.

A description is now given of functions and effects of the electrically driven vehicle 1A. The electrically driven vehicle 1A diagnoses whether the generator unit 11 is capable of generating power, and performs the management of the amount of charge of the first battery 12 according to the diagnostic results.

When it is determined that the generator unit 11 is capable of generating power, the electrically driven vehicle 1A is capable of changing the lower usage limit to a level lower than that used when the generator unit 11 is not capable of generating power. In this case, the electrically driven vehicle 1A utilizes the first battery 12 until the amount of charge of the battery becomes lower than the lower usage limit that has been changed to the lower level. Therefore, the operation start timing of the generator unit 11 can be delayed, as compared with the case where the lower usage limit is the preset lower usage limit. Thus, the first battery 12 can be used more efficiently. Since the first battery 12 can be used more efficiently, the vehicle cruising range can be increased substantially.

When it is determined that the generator unit 11 is capable of generating power, the electrically driven vehicle 1A may change the lower usage limit to a level higher than that used when the generator unit 11 is not capable of generating power. In this case, the first battery 12 is utilized until the amount of charge of the battery becomes lower than the lower usage limit that has been changed to the higher level. Therefore, the operation start timing of the generator unit 11 can be made earlier, as compared with the case where the lower usage limit is the preset lower usage limit. Therefore, in this case, the usage of the first battery 12 is further restricted. Since the usage of the first battery 12 is further restricted, hard working of the first battery 12 can be suppressed and the deterioration of the life of the first battery 12 can be suppressed.

Thus, the electrically driven vehicle 1A is capable of ensuring the appropriate use of the first battery 12 when the generator unit 11 is detachably mounted.

The electrically driven vehicle 1A diagnoses the generating feasible state of the generator unit 11 by making a determination based on the combination of multiple determinations. It is thus possible to appropriately prevent the lower usage limit from being changed although the generator unit 11 is not really capable of generating power, as compared with the case where only the determination as to whether the generator unit 11 has been mounted is made.

Since the electrically driven vehicle 1A is capable of preventing the lower usage limit from being changed inappropriately, the first battery 12 can be used appropriately.

The lower usage limit after it is changed may be predetermined according to a required performance of the electrically driven vehicle 1A, which may give priority to the cruising range of the vehicle or the life of the first battery 12 or may optimize the balance between these items.

The lower usage limit after it is changed may be determined by providing recording means for recording the usage history of the vehicle and referring to the usage history of the vehicle recorded by recording means. This case is preferable because more appropriate effects based on the usage tendency of the vehicle are obtained. In this case, the initial value of the lower usage limited after it is changed may be predetermined according to the required performance of the electrically driven vehicle 1A, or may be predetermined to the preset lower usage limit taking into consideration the fact that the usage history is not present initially.

The lower usage limit after it is changed may be determined by providing operation means capable of adjusting or stepwisely selecting the lower usage limit after it is changed and referring to an operation applied to the operation means. This case is preferable because effects that the user wishes are obtained.

Embodiment 2

Figure 4:
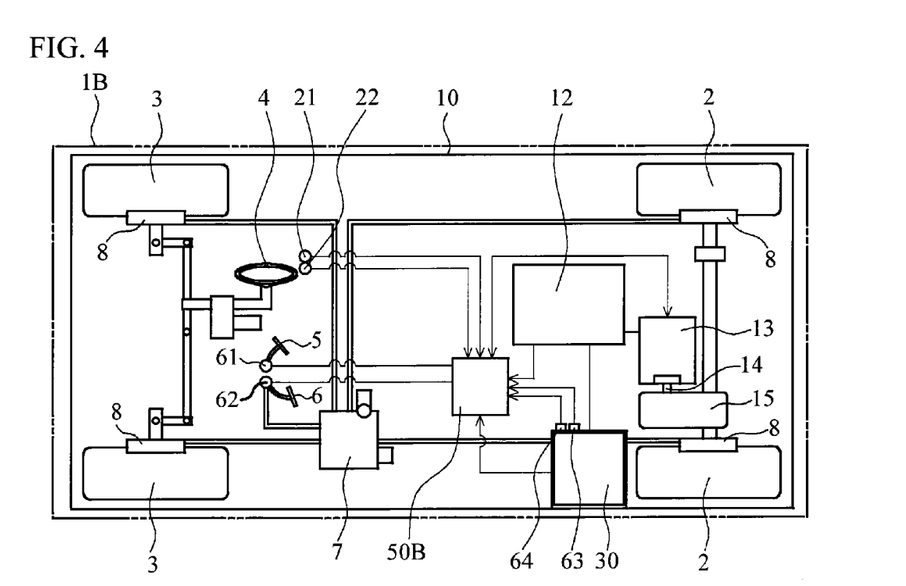
FIG. 4 is a diagram of a schematic structure of an electrically driven vehicle in accordance with a second embodiment.

As illustrated in FIG. 4, an electrically driven vehicle 1B in accordance with the present embodiment is substantially the same as the electrically driven vehicle 1A except that a second battery 30 usable for running is further mounted in the vehicle body 10 detachably, and a second mount sensor 64 is further provided and that a vehicle-side ECU 50B is substituted for the vehicle-side ECU 50A.

The second battery 30 is configured to be mounted so as to be interchangeable with the generator unit 11. Thus, specifically, the second battery 30 is detachably mounted in the same position in the vehicle body 10 as that of the generator unit 11.

The second mount sensor 64 is provided in the vehicle body 10 as state sensing means capable of detecting the mounting/not-mounting of the second battery 30 by sensing the mounted state of the second battery 30. The first mount sensor 63 is provided so as not to detect the mounting/not-mounting of the second battery 30, and the second mount sensor 64 is provided so as not to detect the mounting/not-mounting of the generator unit 11.

The vehicle-side ECU 50B is substantially the same as the vehicle-side ECU 50A except that diagnosis means and management means are realized as described below, and power supply switch means is functionally realized further and that the second battery 30 is electrically connected for the purpose of detecting the amount of charge of the battery and the second mount sensor 64 is electrically connected further.

The vehicle-side ECU 50B is realized so that the diagnosis means diagnoses whether the second battery 30 is usable.

In the process of diagnosing whether the second battery 30 is usable, the diagnosis means is realized to diagnose the usable state of the second battery 30.

In this regard, the diagnosis means may be realized to diagnose the usable state of the second battery 30 by determining whether the second battery 30 has been mounted.

The diagnosis means may be realized to diagnose the state of power generation of the generator unit 11 by determining whether a not-illustrated interlock device provided for detecting whether the mounted state of the generator unit 11 has a regular state (for example, a fixing confirmation device of the second battery 30, or a lock confirmation device of a door for a storage space for the second battery 30), or determining whether the amount of charge of the second battery 30 is sufficient (equal to or larger than a predetermined volume), or determining whether the electrically connected state of the second battery 30 has any abnormality, or by determining whether the mechanically connected state of the second battery 30 has any abnormality, or determining whether the second battery 30 has any abnormality such as failure, or a combination of the above determinations.

Specifically, the diagnosis means is realized to diagnose the usable state of the second battery 30 by using a combination of determinations.

More specifically, the diagnosis means is realized to determine that the second battery 30 is usable when the diagnostic results show that the second battery 30 has been mounted and the interlock device detects the regular state and that the amount of charge of the second battery 30 is equal to or larger than the predetermined level and the electric connection of the second battery 30 has no abnormality, and show that the second battery 30 is usable.

In the process of diagnosing the generating feasible state of the second battery 30, the diagnosis means may be realized to include, as a basic determination, at least the step of determining whether the second battery 30 has been mounted. However, the diagnosis is not limited to the above, but may include, as a basic determination, the step of determining whether the electric connection of the second battery 30 has any abnormality, whereby the determination as to whether the second battery 30 has been mounted may be made indirectly.

The vehicle-side ECU 50B functionally realizes management means for performing a management of the amount of charge of the first battery 12 according to the diagnostic results of the second battery 30.

Specifically, the management means is realized to change the lower usage limit as a management of the amount of charge of the first battery 12 when the diagnosis means determines that the second battery 30 is usable. In the electrically driven vehicle 1B, the present lower usage limit is the lower usage limit defined when the generator unit 11 is not capable of generating power and the second battery 30 is not usable.

In the process of changing the lower usage limit, specifically, the management means may be realized to set the lower usage limit to a level lower than that for the case where the second battery 30 is not usable. Also, the management means may be realized to set the lower usage limit to a level higher than that for the case where the second battery 30 is not usable.

The power supply switch means is realized to perform a control of switching the power supply from the first battery 12 to the second battery 30 when the second battery 30 is usable and the amount of charge of the first battery 12 becomes lower than the lower usable limit. In this case, the lower usable limit is that after it is changed.

Figure 5:
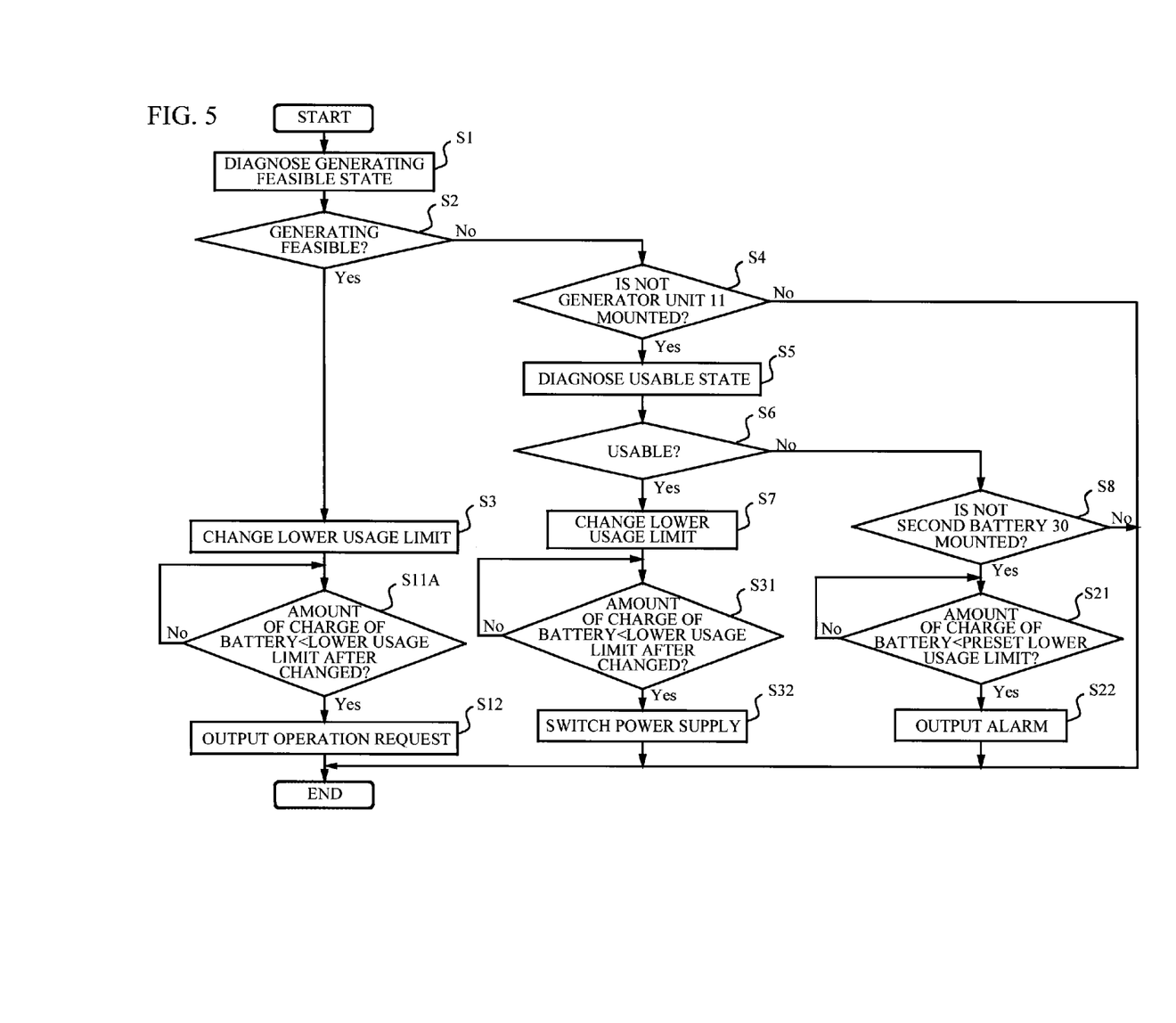
FIG. 5 is a flowchart of an operation of a vehicle-side ECU in accordance with Embodiment 2.

A description is now given of an operation of the vehicle-side ECU 50B in conjunction with a flowchart of FIG. 5. The present flowchart is the same as that of FIG. 3 except that steps S5 through S8 and steps S31 and 32 are added. Therefore, these steps are specifically described. Subsequent to a positive determination in step S4, the vehicle-side ECU 50B diagnoses the usable state of the second battery 30 (step S5), and determines whether the second battery 30 is usable or not (step S6). When a negative determination is made in step S6, the vehicle-side ECU 50B determines whether the second battery 30 is not mounted (step S8). When a positive determination is made, the flow process is ended. In this case, an alarm that notifies the user of an abnormality of the second battery 30 may be output. In contrast, when a negative determination is made in step S8, the process proceeds to step S21.

In contrast, when a positive determination is made in step S6, the vehicle-side ECU 50B changes the lower usage limit (step S7). Subsequently, the vehicle-side ECU 50B determines whether the amount of charge of the first battery 12 becomes lower than the lower usage limit (step S31). When a negative determination is made, step S31 is repeatedly performed until a position determination is made. In contrast, when a positive determination is made in step S31, the vehicle-side ECU 50B switches the power supply from the first battery 12 to the second battery 30 (step S32).

A description is now given of functions and effects of the electrically driven vehicle 1B. The electrically driven vehicle 1B is configured to detachably mount the second battery 30 usable for running in addition to the generator unit 11. Thus, the electrically driven vehicle 1B is capable of improving the convenience because a shortage of charge of the first battery 12 may be compensated for by not only the generator unit 11 but also the second battery 30.

In addition to the generator unit 11, the electrically driven vehicle 1B is configured to detachably mount the second battery 30 so as to be interchangeable with the generator unit 11. Thus, the second battery 30 can be detachably mounted in the vehicle body 10 without a great change of the vehicle body, whereby the electrically driven vehicle 1B has a cost advantage.

In the electrically driven vehicle 1B configured to detachably mount the second battery 30 in addition to the generator unit 11, in order to ensure the appropriate use of the first battery 12, the usable state of the second battery 30 is diagnosed and the amount of charge of the first battery 12 is managed.

When it is determined that the second battery 30 is usable, the lower usable limit can be changed to a level lower than that used when the second battery 30 is not usable. In this case, the usage start timing of the second battery 30 can be delayed, as compared with the case where the usage lower limit is the preset lower usage limit. Thus, the first battery 12 is used more efficiently, and the vehicle cruising range can be increased substantially.

When it is determined that the second battery 30 is usable, the lower usable limit can be changed to a higher lower than that used when the second battery 30 is not usable. In this case, the operation start timing of the generator unit 11 can be made earlier. Thus, the usage of the first battery 12 can be restricted more strongly, so that the hard working of the first battery 12 can be suppressed and the deterioration of the life of the first battery 12 can be suppressed.

Thus, the electrically driven vehicle 1B is capable of ensuring the appropriate use of the first battery 12 although the second battery is detachably mounted further, as compared with the electrically driven vehicle 1A.

The electrically driven vehicle 1B diagnoses the usable state of the second battery 30 by the combination of multiple determinations. Thus, it is thus possible to appropriately prevent the lower usage limit from being changed although the second battery 30 is not really usable, as compared with the case where only the determination as to whether the second battery 30 has been mounted is made, for example.

Since the electrically driven vehicle 1B is capable of preventing the lower usage limit from being changed inappropriately, the first battery 12 can be used appropriately.

In the electrically driven vehicle 1B, the lower usage limit after it is changed may be set in a manner similar to that for the electrically driven vehicle 1A.

Embodiment 3

An electrically driven vehicle 1C in accordance with the present embodiment is substantially the same as the electrically driven vehicle 1A except that a vehicle-side ECU 50C is substituted for the vehicle-side ECU 50A. The vehicle-side ECU 50C is substantially the same as the vehicle-side ECU 50A except that diagnosis means and management means are realized as described below. Therefore, an illustration of the electrically driven vehicle 1C is omitted. A similar change may be applied to the electrically driven vehicle 1B previously described in Embodiment 2.

The vehicle-side ECU 50C is realized to further diagnose the generating feasible power amount of the generator unit 11.

Specifically, the diagnosis means may be realized to diagnose the generating feasible power amount of the generator unit 11 on the basis of the remaining amount of fuel of the generator unit 11, the type of fuel, or operation conditions of the generator unit 11 such as conditions with the rated power or conditions with the maximum power.

The diagnosis means is realized to diagnose the generating feasible power amount of the generator unit 11 when diagnosing that the generator unit 11 is capable of generating power.

In the vehicle-side ECU 50C, when the diagnosis means determines that the generator unit 11 can generate power and diagnoses the generating feasible power amount, the management means is realized o further amend the management of the amount of charge of the first battery 12 according to the generating feasible power amount.

Specifically, the management means is realized to amend the management of the amount of charge of the first battery 12 by amending the lower usage limit according to the generating feasible power amount. In this case, specifically, the lower usage limit is that after it is changed.

In the change of the lower usage limit, the management means may be realized to amend the lower usage limit in such a manner that the lower usage limit becomes smaller as the generating feasible power amount becomes large. The management mans may be realized to amend the lower usage limit in such a manner that the lower usage limit becomes larger as the generating feasible power amount becomes large.

Figure 6:
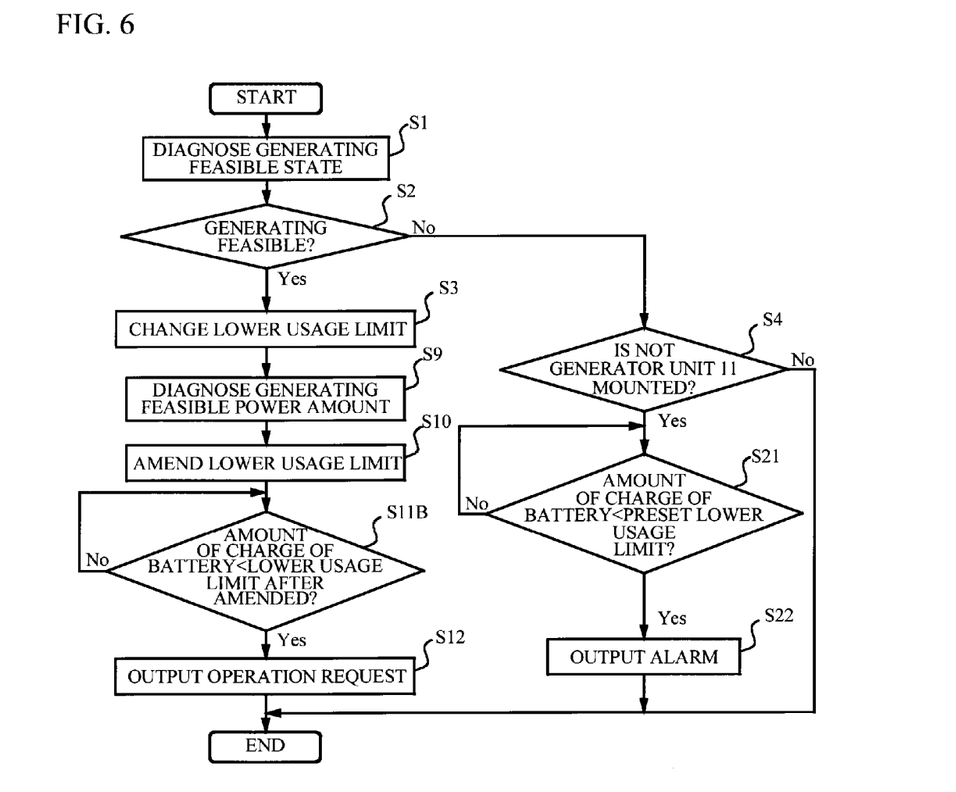
FIG. 6 is a flowchart of an operation of a vehicle-side ECU in accordance with Embodiment 3.

An operation of the electrically driven vehicle 1C is described in conjunction with a flowchart of FIG. 6. The present flowchart is the same as the flowchart of FIG. 3 except that steps S9 and S10 are added, and step S11B is substituted for step S11A. Therefore, these steps are specifically described here. Subsequent to step S3, the vehicle-side ECU 50C diagnoses the generating feasible power amount (step S9), and amends the lower usage limit according to the generating feasible power amount (step S10). Subsequently, the vehicle-side ECU 50C determines whether the amount of charge of battery becomes lower than the lower usage limit after it is changed (step S11B). When a negative determination is made, step S11B is repeatedly performed until a positive determination is made. When a position determination is made in step S11B, the flow control proceeds to step S12.

A description is now given of functions and effects of the electrically driven vehicle 1C. The electrically driven vehicle 1C diagnoses the generating feasible power amount of the generator unit 11 and amends the lower usage limit according to the generating feasible power amount, as compared with the electrically driven vehicle 1A.

In the electrically driven vehicle 1C, the lower usage limit may be amended to become smaller as the generating feasible power amount becomes larger. In this case, the usage start timing of the second battery 30 may be delayed, as compared with the case where the lower usage limit is that before it is amended (that is, the lower usage limit after it is changed). Thus, the vehicle cruising range can be substantially increased as compared with the electrically driven vehicle 1A because the first battery 12 can be used more efficiently.

In the electrically driven vehicle 1C, the lower usage limit may be amended to become larger as the generating feasible power amount becomes large. In this case, the usage start timing of the generator unit 11 may be made earlier, as compared with the case where the usage lower limit is that before it is amended (that is, the usage lower limit after it is changed). In this case, since the usage of the first battery 12 is further restricted, the hard work of the first battery 12 can be further suppressed. As a result, the deterioration of the life of the first battery 12 can be suppressed, as compared with the electrically driven vehicle 1A.

Thus, the electrically driven vehicle 1C is capable of ensuring the appropriate use of the first battery 12 because the first battery 12 can be used appropriately according to the amount of energy capable of really compensating for a shortage of charge of the first battery 12, as compared with the electrically driven vehicle 1A.

The above-described embodiments are exemplary preferred embodiments of the invention. However, the present invention is not limited to these embodiments but may be carried out with various variations.

For example, in the above-described embodiments, the amount of charge of the first battery 12 is managed by changing the lower usage limit.

However, the present invention is not necessarily limited to this, but the management means may manage the amount of charge of the first battery by setting the upper charge limit on the first battery and changing the upper charge limit.

In this case, by changing the upper charge limit to a relatively lower level, the occasion for utilizing the generator unit may be increased, so that the deterioration of the life of the first battery can be suppressed. Further, by changing the upper charge limit to a relatively higher level, the first battery can be utilized more efficiently.

In the above-described Embodiment 3, the diagnosis means diagnoses the generating feasible power amount and amends the management of the amount of charge of the first battery according to the generating feasible power amount. However, the present invention is not necessarily limited to this, but the diagnosis means further diagnoses the amount of charge of the second battery and the management means may amend the management of the amount of charge of the first battery according to the amount of charge of the second battery.

In this case, the management means may amend the lower usage limit so as to be smaller as the amount of charge of the second battery is larger, or may amend the lower usage limit as the amount of charge of the second battery is larger.

In the above-described Embodiment 2, the second battery 30 is detachably mounted in the vehicle body 10 so as to be interchangeable with the generator unit 11.

However, the present invention is not limited to this, but the electrically driven vehicle may be configured to detachably mount both the generator unit and the second battery in parallel. The electrically driven vehicle may be configured to detachably mount at least either more than one generator unit or more than one second battery in parallel.

In this case, the diagnosis means may wholly diagnose whether more than one generator unit is capable of generating power or whether more than one second battery can be used. The management means may manage the amount of charge of the first battery according to the multiple diagnostic results.

In this case, power supply may be carried out by generating power by a certain generator unit out of among the generator units when the amount of charge of the first battery becomes lower than the lower usage limit. After that, when the generator unit fails to generate power any more (or when a certain second battery among the second batteries is used and fails to be used any more), power supply may be carried out by sequentially another generator unit to generate power or utilizing another second battery.

Thus, the first battery can be utilized appropriately, as compared with the case where the amount of charge of the first battery is managed by the diagnostic result of only one of the generator units and the second batteries. In this case, the lower usage limit is further amended according to the generating feasible power amount of each of the generator units and the amount of charge of each of the second batteries, whereby the first battery can be utilized more appropriately.

In the above-described embodiments, the various means functionally realized by the vehicle-side ECUs 50A, 50B and 50C may be realized by hardware such as another electronic control device or a dedicated electronic circuit, or a combination thereof.

DESCRIPTION OF REFERENCE NUMERALS

1A, 1B, 1C electrically driven vehicle
10 vehicle body
11 generator unit
111 engine
12 first battery
30 second battery
50A, 50B, 50C vehicle-side ECU

The invention claimed is:

1. An electrically driven vehicle comprising:
a vehicle body;
a first battery mounted in the vehicle body and usable for running;
a generator unit that is detachably mounted in the vehicle body and charges the first battery;
a diagnosis part configured to diagnose whether the generator unit is capable of generating power; and
a management part configured to perform a management of an amount of charge of the first battery according to a diagnostic result of the diagnosis part, wherein
a lower usage limit is provided for the amount of charge of the first battery,
the electrically driven vehicle further comprises:
an output control part configured to output an operation request to the generator unit when the diagnosis part determines that the generator unit is capable of generating power and the amount of charge of the first battery becomes lower than the lower usage limit, and the management part changes the lower usage limit of the first battery as the management of the amount of charge of the first battery when the diagnosis part determines that the generator unit is capable of generating power.

2. The electrically driven vehicle according to claim 1, wherein:

when the diagnosis part determines that the generator unit is capable of generating power, the management part changes, as the management of the amount of charge of the first battery, the lower usage limit to a level lower than that used when the generator unit is not capable of generating power.

3. The electrically driven vehicle according to claim 2, wherein:

a second battery usable for running is detachably mounted in the vehicle body; and the diagnosis part diagnoses whether the second battery is usable, and when the diagnosis part determines that the second battery is usable, the management part changes, as the management of the amount of charge of the first battery, the lower usage limit to a level lower than that used when the second battery is not usable.

4. The electrically driven vehicle according to claim 1, wherein:

when the diagnosis part determines that the generator unit is capable of generating power, the management part changes, as the management of the amount of charge of the first battery, the lower usage limit to a level higher than that used when the generator unit is not capable of generating power.

5. The electrically driven vehicle according to claim 4, wherein:

a second battery usable for running is detachably mounted in the vehicle body; and the diagnosis part diagnoses whether the second battery is usable, and when the diagnosis part determines that the second battery is usable, the management part changes, as the management of the amount of charge of the first battery, the lower usage limit to a level higher than that used when the second battery is not usable.

6. The electrically driven vehicle according to claim 1, wherein:

the diagnosis part diagnoses a generating feasible power amount of the generator unit in a process of diagnosing whether the generator unit is capable of generating power; and the management part further amend the management of the amount of charge of the first battery according to the generating feasible power amount.

* * * * *

UNITED STATES PATENT AND TRADEMARK OFFICE
CERTIFICATE OF CORRECTION

PATENT NO. : 8,892,282 B2  
APPLICATION NO. : 13/520951  
DATED : November 18, 2014  
INVENTOR(S) : Nobuhisa Jingu Page 1 of 1

It is certified that error appears in the above-identified patent and that said Letters Patent is hereby corrected as shown below:

On the title page, Item (73) Assignee's country of residence is incorrect. Item (73) should read:

-- (73)   Toyota Jidosha Kabushiki Kaisha, Toyota-shi (JP) --

Signed and Sealed this  
Seventeenth Day of November, 2015

Michelle K. Lee  
*Director of the United States Patent and Trademark Office*